(12) United States Patent
Avidor (10) Patent No.: US 6,321,613 B1
(45) Date of Patent: Nov. 27, 2001

(54) CONTINUOUSLY VARIABLE TRANSMISSION

(76) Inventor: Joseph Avidor, 20 Hapardes St., Ramat Hasharon (IL), 47405

( * ) Notice: Subject to any disclaimer, the term of this patent is extended or adjusted under 35 U.S.C. 154(b) by 0 days.

(21) Appl. No.: 09/605,028

(22) Filed: Jun. 28, 2000

(51) Int. Cl.$^7$ ..................................................... F16H 3/22
(52) U.S. Cl. ................................................................ 74/348
(58) Field of Search ................................................ 74/348

(56) References Cited

U.S. PATENT DOCUMENTS

| | | | |
|---|---|---|---|
| 1,111,551 | * 9/1914 | Adams | 74/348 |
| 1,508,879 | * 9/1924 | Healey | 74/348 |
| 1,817,819 | * 8/1931 | Healey | 74/348 |
| 5,653,143 | * 8/1997 | Langevin | 74/348 |

* cited by examiner

Primary Examiner—Dirk Wright (74) Attorney, Agent, or Firm—Mark M. Friedman (57) ABSTRACT

A variable ratio transmission for transferring torque between an input port and an output port includes two transmission shafts mounted with an angle θ between them. A first of the shafts supports a series of at least two conical gear wheels, of different sizes and having different numbers of gear teeth, in such a manner as to define a predefined range of angular motion through which each conical gear can turn relative to its shaft. The conical gear wheels together define a conical external profile at an angle θ to the first axis. A sliding gear wheel, configured for driving engagement with any one of the conical gear wheels, is engaged so as to slide along, and yet rotate together with, the second transmission shaft. An actuator displaces the sliding gear wheel along the second transmission shaft parallel to the second axis between positions corresponding to selective engagement with each of the conical gears, thereby varying a drive ratio between the first and second transmission shafts.

9 Claims, 8 Drawing Sheets

CONTINUOUSLY VARIABLE TRANSMISSION

FIELD AND BACKGROUND OF THE INVENTION

The present invention relates to variable ratio transmission and, in particular, it concerns a continuously variable transmission based on a conical arrangement of gear wheels.

Most conventional transmissions provide a relatively small number of discrete gear ratios between the rates of rotation of an input shaft and an output shaft. For example, in automotive applications, most vehicle gear boxes offer 3, 4 or at most 5 forward gear ratios to match road speed to a suitable engine speed. Although this number of gears is sufficient to bring the engine speed within its normal operative range, the matching of engine speed to road speed and desired power is typically very inefficient. For any given desired power output, an engine should optimally be run at a corresponding given engine speed. However, due to the very limited ratios available, the engine speed will almost always be either too low, resulting in less power than desired, or too high, resulting in energy wastage.

Theoretically, the engine speed mismatch could be reduced by providing more numerous, more closely spaced gear ratios. Since, however, each gear ratio is defined by the ratio of the numbers of gear teeth on two meshed gear wheels, each change of ratio requires disengagement of a first pair of gear wheels and engagement of another. Additional disengagement and slow re-engagement of a clutch is also required to allow matching of the new engine speed. As a result, the introduction of more frequent ratio changes would itself be highly disruptive to the operation of the transmission, causing corresponding lowering of efficiency.

In an attempt to improve efficiency and/or performance, various systems have been developed to provide a continuously variable transmission ratio, commonly referred to as "continuously variable transmissions" (CVT). These systems have abandoned the intermeshed gear wheel structure in favor of traction-based engagement which allows smooth ratio transitions without disengagement. Among the most prevalent examples of such systems are the Van-Doome belt or "V-belt", and the toroidal traction drive.

Theoretically, because of correct matching of engine speed to the required power, CVT systems should be considerably more efficient than conventional fixed ratio transmissions. In practice, however, energy savings are small to non-existent. This is primarily due to major frictional losses and slippage which are generally inherent to traction-based systems.

There is therefore a need for a variable transmission based upon intermeshing gear wheels which would offer transition between different gear ratios without disrupting the driving engagement. Such a transmission would allow substantially unlimited numbers of gear wheels, thereby approaching near-optimal use of engine performance.

SUMMARY OF THE INVENTION

The present invention is a continuously variable transmission.

According to the teachings of the present invention there is provided, a variable ratio transmission for transferring torque between an input port and an output port, the variable ratio transmission comprising: (a) a first transmission shaft rotatable about a first axis and configured to provide a first of the input and output ports; (b) a series of at least two conical gear wheels of different sizes and having different numbers of gear teeth, each of the conical gear wheels being mounted upon, and rotationally coupled to, the first transmission shaft in such a manner as to define a predefined range of angular motion through which the conical gear can turn relative to the first transmission shaft about the first axis, the series together defining a conical external profile at an angle $\theta$ to the first axis; (c) a second transmission shaft rotatable about a second axis and configured to provide a second of the input and output ports, the second axis being disposed at an angle $\theta$ relative to the first axis; (d) a sliding gear wheel slidingly engaged with the second transmission shaft so as to rotate together with the second transmission shaft while being slidable in a direction parallel to the second axis, the sliding gear wheel being configured for driving engagement with any one of the conical gear wheels; and (e) an actuator associated with the sliding gear wheel and configured to displace the sliding gear wheel along the second transmission shaft parallel to the second axis between positions corresponding to selective engagement with each of the conical gears, thereby varying a drive ratio between the first and second transmission shafts.

According to a further feature of the present invention, the series of at least two conical gear wheels is implemented as a series of at least ten conical gear wheels.

According to a her feature of the present invention, the predefined range of angular motion through which a given one of the conical gears can turn relative to the first transmission shaft about the first axis is at least equal to an angular spacing of the gear teeth about the axis.

According to a further feature of the present invention, there are also provided a plurality of spring elements associated at least with the gear wheels and configured to bias the gear wheels to a predefined angular position within the predefined range of angular motion relative to the first transmission shaft.

According to a further feature of the present invention, the spring elements are configured to bias the gear wheels to an intermediate angular position within a middle third of the predefined range of angular motion.

According to a further feature of the present invention, there is also provided a controller operatively connected to the actuator for controlling displacement of the sliding gear wheel, wherein the series of conical gear wheels and the spring elements are configured such that, for a given pair of adjacent ones of the conical gear wheels, when a first of the pair of gear wheels is in the predefined angular position and a second of the pair of gear wheels is forced to an extreme of the predefined range of angular motion, gear teeth of the pair of conical gear wheels are substantially aligned in a changeover region defined angularly about the first axis relative to the first transmission shaft, the controller being configured to actuate the actuator to move the sliding gear wheel from engagement with the second gear wheel to the first gear wheel when the sliding gear wheel is engaged within the second gear wheel in the changeover region.

According to a further feature of the present invention, the actuator includes: (a) an elongated threaded bolt deployed parallel to the second transmission shaft; (b) a rider in threaded engagement with the elongated threaded bolt, the rider being mechanically linked to the sliding gear wheel; and (c) a drive unit deployed to rotate the elongated threaded bolt, thereby displacing the rider, and hence the sliding gear wheel, parallel to the second axis.

According to a further feature of the present invention, the gear teeth of the conical gear wheels are rounded at their axial extremes.

According to a further feature of the present invention, the gear teeth of the conical gear wheels are rounded at their radial extremes.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a variable ratio transmission.

The principles and operation of variable ratio transmissions according to the present invention may be better understood with reference to the drawings and the accompanying description.

Referring now to the drawings, FIGS. 1–11 show various aspects of a variable ratio transmission, generally designated 10, for transferring torque between an input port and an output port.

Figure 1:
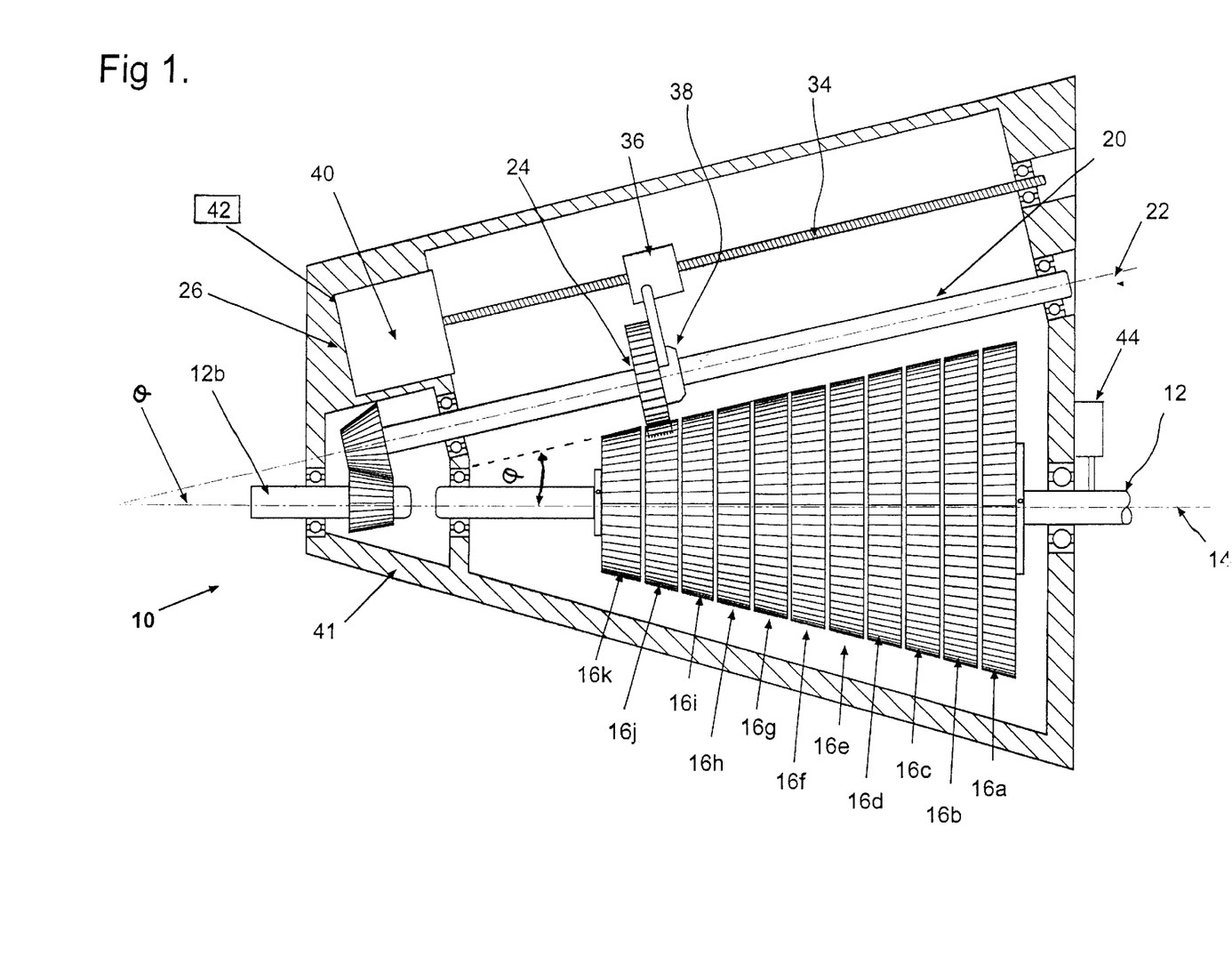
FIG. 1 is a partially cut-away schematic plan view of a variable ratio transmission, constructed and operative according to the teachings of the present invention, employing a conical arrangement of gear wheels.

Generally speaking, variable ratio transmission 10 has a first transmission shaft 12, rotatable about a first axis 14, providing either the input or output port. A series of at least two, and preferably at least ten, conical gear wheels (16a, 16b, 16c, . . . ) of different sizes and having different numbers of gear teeth 18 are mounted upon, and rotationally coupled to, transmission shaft 12. The series of conical gear wheels together define a conical external profile at an angle θ to the first axis.

A second transmission shaft 20, rotatable about a second axis 22, is configured to provide the second of the input and output ports. Second axis 22 is disposed at an angle θ relative to first axis 14. A sliding gear wheel 24 slidingly engages second transmission shaft 20 so as to rotate together therewith while being slidable in a direction parallel to second axis 22. Sliding gear wheel 24 is configured for driving engagement with any one of conical gear wheels 16a, 16b, 16c, etc. An actuator 26 is configured to displace sliding gear wheel 24 along second transmission shaft 20 parallel to axis 22 between positions corresponding to selective engagement with each of conical gears 16a, 16b, 16c, etc., thereby varying a drive ratio between first and second transmission shafts 12 and 20 without disengaging the driving engagement between them.

While such conical configurations are familiar in the context of traction-based systems, they have not hitherto been used in systems of intermeshed gears. This is primarily due to the non-trivial problem of moving sliding gear wheel 24 between adjacent conical gears. Specifically, with reference to FIG. 3, since adjacent conical gears have different numbers of teeth 18 with different angular spacing, the teeth of sliding gear wheel 24 which are engaged with a first conical gear 16b may, at a given moment, be out of step with the spaces between the teeth of the adjacent conical gear 16c. In the example illustrated here, teeth 18 are in step at four positions in every revolution while being out of step at intermediate positions. As a result, such an arrangement would generally be considered inoperative since the out of step relation of the teeth would obstruct the axial motion of sliding gear wheel 24 necessary for the change of gear ratio between these two conical gear wheels.

To address this problem, it is a particular feature of preferred embodiments of the present invention that conical gear wheels 16a, 16b etc. are rotationally coupled to transmission shaft 12 in such a manner as to define a predefined range of angular motion through which the conical gear can turn relative to the first transmission shaft about the first axis. This range of motion permits the adjacent conical gear to undergo slight angular displacement to allow intermeshing with sliding gear wheel 24 independent of the prior relative alignment of teeth of adjacent conical gear wheels. Since the ratio change is achieved by sliding gear wheel 24 moving through a transition position in which it is momentarily engaged with two conical gear wheels simultaneously, the gear ratio change does not lead to any significant disruption to the transfer of driving torque. As soon as the transfer of sliding gear wheel engagement to the adjacent conical gear wheel is complete, the driving torque brings the engaged conical gear wheel to one end of the range of angular motion so that first and second transmission shafts 12 and 20 are coupled in driving relation with the full efficiency of a conventional intermeshed gear transmission.

Figures 2, 3, 4:
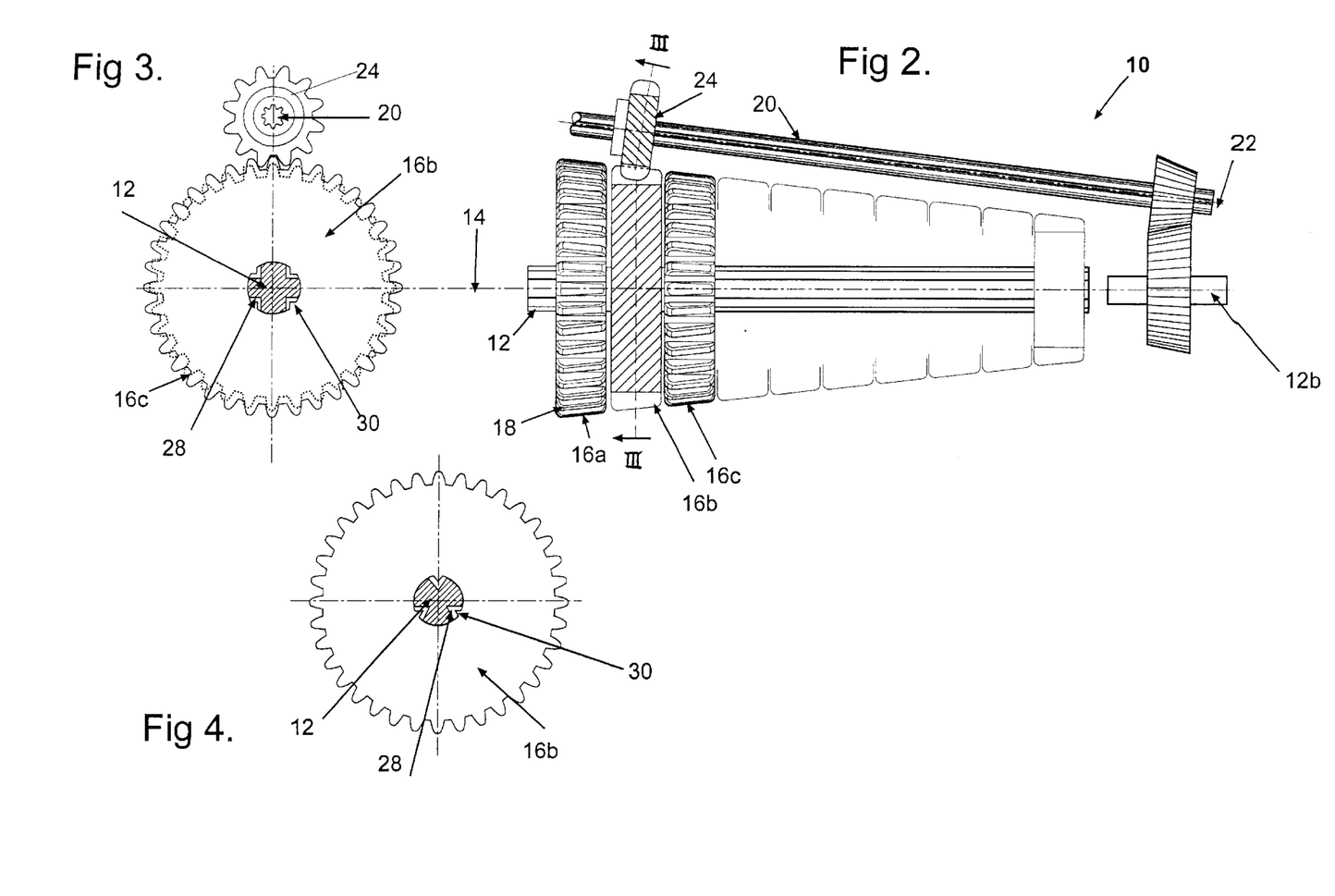
FIG. 2 is an enlarged, partially sectioned view of an implementation of the conical arrangement of gears from FIG. 1 showing a form of the gear teeth.
FIG. 3 is a cross-sectional view through a conical gear wheel taken along line III—III of FIG. 2.
FIG. 4 is a cross-sectional view of a variation of the conical gear wheel of FIG. 3.

Turning now to the features of the present invention in more detail, FIG. 3 shows one preferred implementation to achieve the aforementioned predefined range of angular motion of conical gear wheel, in this case 16b, relative to first transmission shaft 12. In this case, shaft 12 is formed with a number of V-grooves 28 running along its length, i.e. parallel to axis 14, and the conical gear wheels are formed with corresponding inward projections 30 configured to delineate the range of motion. Grooves 28 and projections 30 are preferably distributed symmetrically about axis 14 to as to distribute the applied torque forces symmetrically. FIG. 3 shows an example with four such grooves and projections, while FIG. 4 shows a similar configuration with only three such features.

The extent of the range of motion is preferably defined differently for each gear wheel. The minimum range for a given gear wheel is preferably at least equal to the angular period of the gear teeth for that gear wheel, thereby ensuring that at least one position of alignment for intermeshing with gear wheel 24 always lies within the range of motion. Thus, for a gear wheel with 30 teeth, the range of motion is preferably at least 12° (360°/30) while for a gear wheel with 20 teeth, a minimum of 18° (360°/20) is preferred.

In order to ensure that the conical gear wheels do not become jammed at one extreme of the range of motion before arriving at a position suitable for meshing with sliding gear wheel 24, it is clearly important that the conical gear wheels start from a position removed from the extreme positions of the range. To this end, variable transmission 10 preferably also includes a plurality of spring elements 32 associated at least with the conical gear wheels and configured to bias the conical gear wheels to a predefined angular position within the predefined range of angular motion relative to the first transmission shaft. This predefined initial position is preferably within a middle third of the predefined range of angular motion, and most preferably, substantially central to that range.

Figure 6:
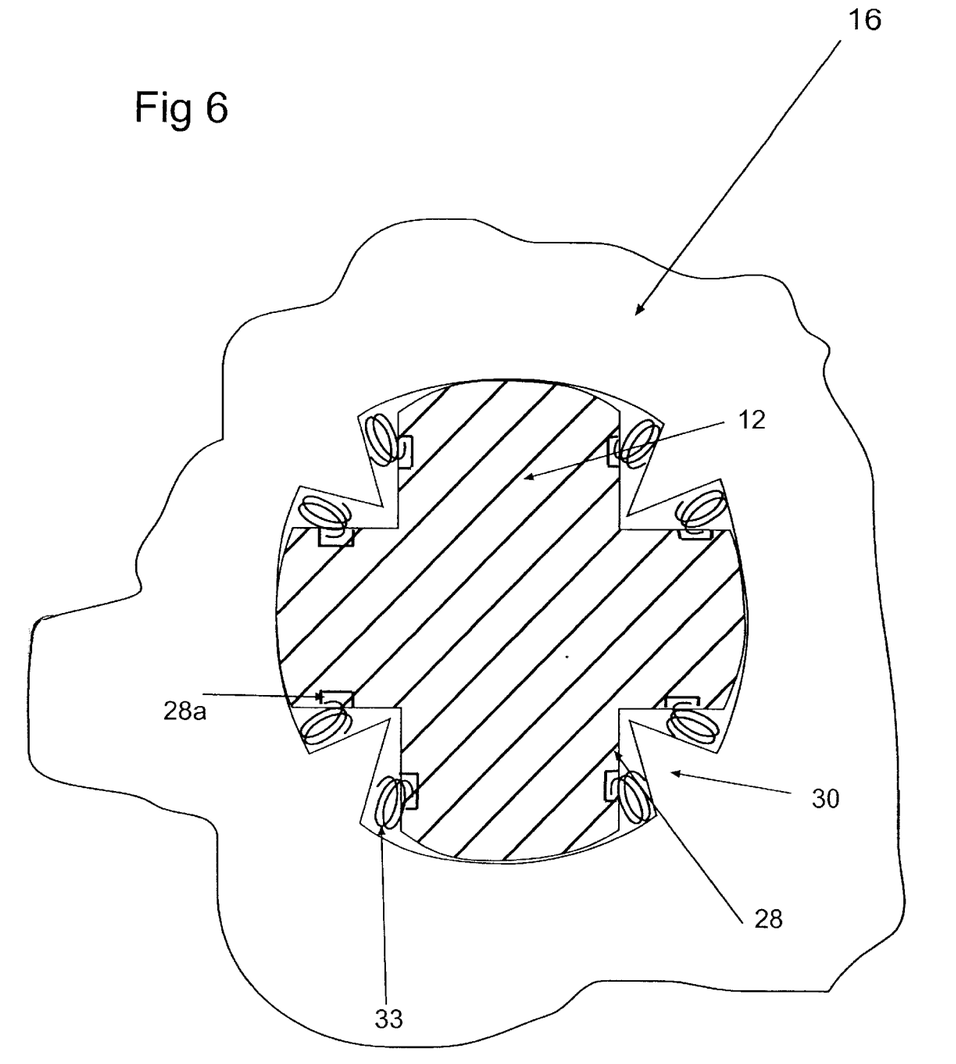
FIG. 6 is an enlarged partial view similar to FIG. 3 showing a first arrangement of spring elements.
Figure 7A:
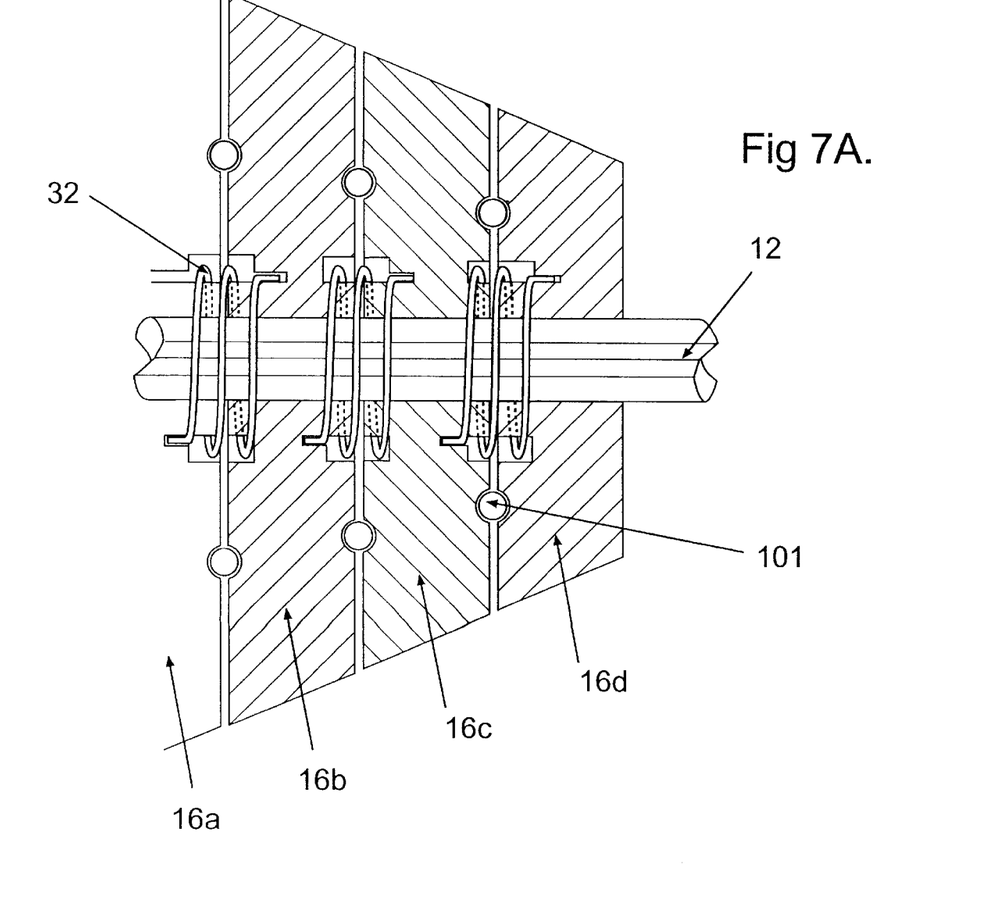
FIG. 7A is a schematic cross-sectional view taken through a number of the conical gear wheels from FIG. 1 illustrating a second arrangement of spring elements.
Figure 7B:
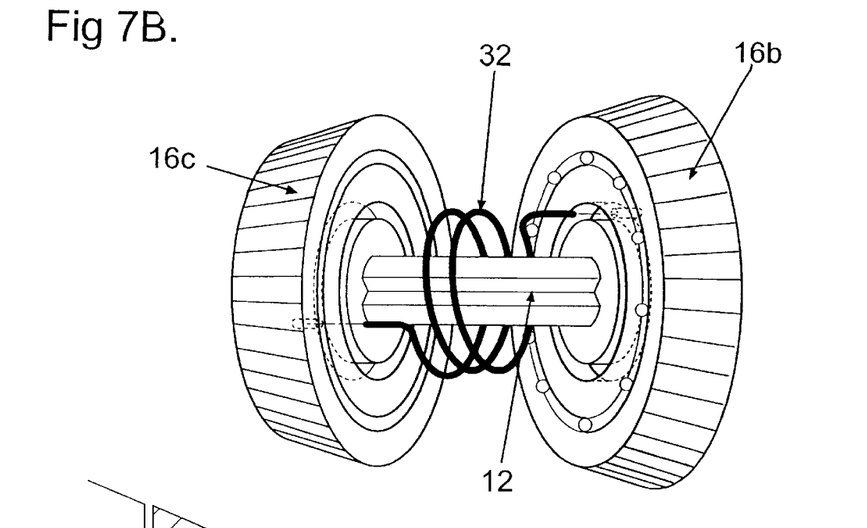
FIG. 7B is a schematic exploded isometric view showing the arrangement of spring elements of FIG. 7A.

By way of example, FIG. 6 and FIGS. 7A and 7B show two possible arrangement of spring elements 32, 33, deployed relative to shaft 12 or directly between adjacent conical gear wheels, respectively. Specifically, FIG. 6 shows an example in which springs 33 are mechanically linked directly to shaft 12 so as to maintain each conical gear wheel near the middle of its range of angular motion. Recesses 28a are preferably provided to accommodate all or part of springs 33 when the conical gear wheel is at the end of its range of angular motion. FIGS. 7A and 7B show an alternative implementation wherein spring elements 32 interconnect adjacent conical gear wheels. Parenthetically, also visible in FIG. 7A are a number of bearings 101 which are preferably deployed in annular grooves on facing surfaces of the conical gear wheels to ensure reliable independent motion of the gear wheels.

Another factor to be considered in designing the range of angular motion of conical gear wheels is the speed of switchover of sliding gear wheel 24 between adjacent conical gear wheels. As will be discussed further below, the speed of displacement of sliding gear wheel 24 is preferably fast relative to rotation of shaft 12. In other words, the time during which sliding gear wheel 24 is engaged simultaneously with two conical gear wheels is preferably less than, and most preferably less than about 10% of, the time taken for a single revolution of shaft 12. To the extent that this switchover time is actually short, an angular range of motion close to (i.e., within about 50% beyond) the minimum values mentioned above is generally sufficient. It will be appreciated, however, that the range of motion of each conical gear must also be sufficient to accommodate the total difference of angular differential between adjacent gears which could accumulate during the simultaneous engagement part of the switchover motion. Thus, if adjacent gears differ by 4 teeth and the switchover could take up to ½ a revolution, the total range of motion should preferably be increased by at least twice the angular period of the teeth (i.e., a total of 3 periods).

Although the example illustrated in FIG. 3 shows a case of adjacent conical gear wheels differing by four teeth, it should be understood that both the number of conical gear wheels and the numbers of teeth may be varied according to the desired technical specifications. In certain cases, particularly smooth operation and a best approximation to CVT may be offered by employing a series of conical gear wheels for which the numbers of the gear teeth on adjacent gear wheels differ by only one. In other cases, larger differentials between adjacent wheels may be preferred, particularly where a wide range of gear ratios and/or more compact design are required.

Figure 8:
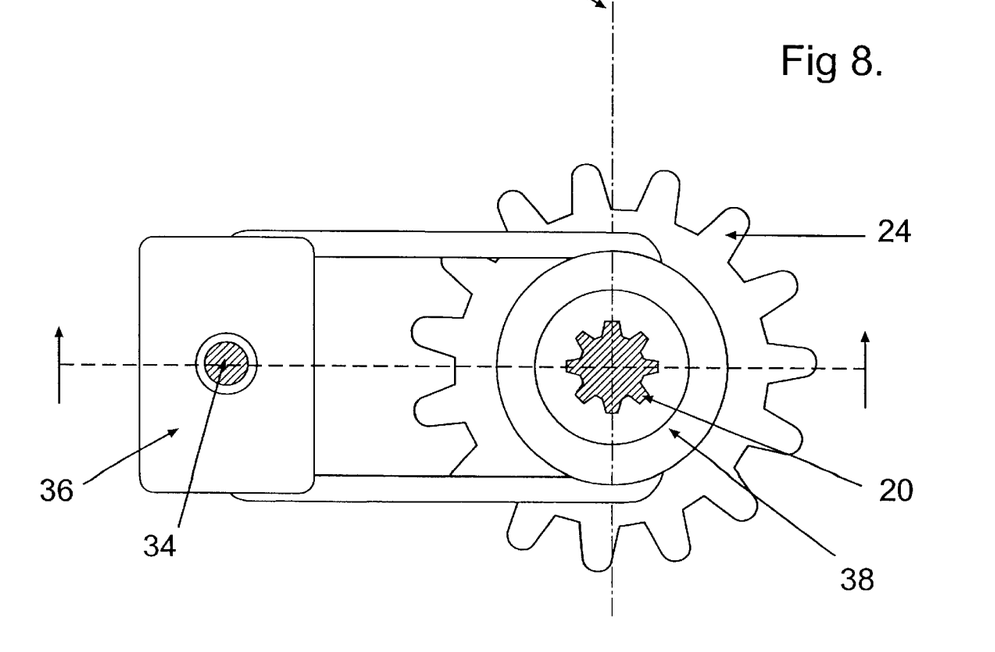
FIG. 8 is an axial view of a sliding gear wheel and associated actuator from the variable ratio transmission of FIG. 1.
Figure 9:
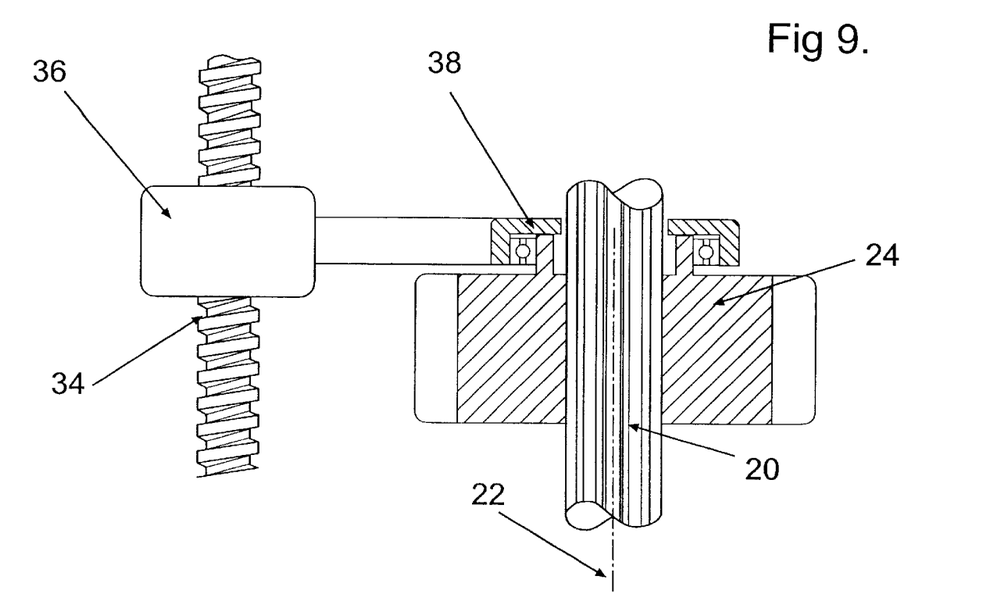
FIG. 9 is a cross-sectional view taken along line IX—IX of FIG. 8.

FIGS. 8 and 9 show a preferred implementation of actuator 26. In this case, actuator 26 includes an elongated threaded bolt 34 deployed parallel to second transmission shaft 20, and a rider 36 in threaded engagement therewith. Rider 36 is mechanically linked to sliding gear wheel 24, in this case via an annular bearing assembly 38. A drive unit 40 is deployed to rotate bolt 34, thereby displacing rider 36, and hence gear wheel 24, parallel to second axis 22.

As mentioned above, the time during which sliding gear wheel 24 is engaged simultaneously with two conical gear wheels is preferably short. To this end, drive unit 40 is preferably implemented as a fast response unit. One example of a suitable unit is a computer controlled servo motor.

It should be appreciated that the form of actuator 26 described here is one of a number of possible implementations. By way of example, it should be noted that actuator 26 may alternatively be implemented using a hydraulic actuator configured to displace sliding gear wheel 24.

Figure 5:
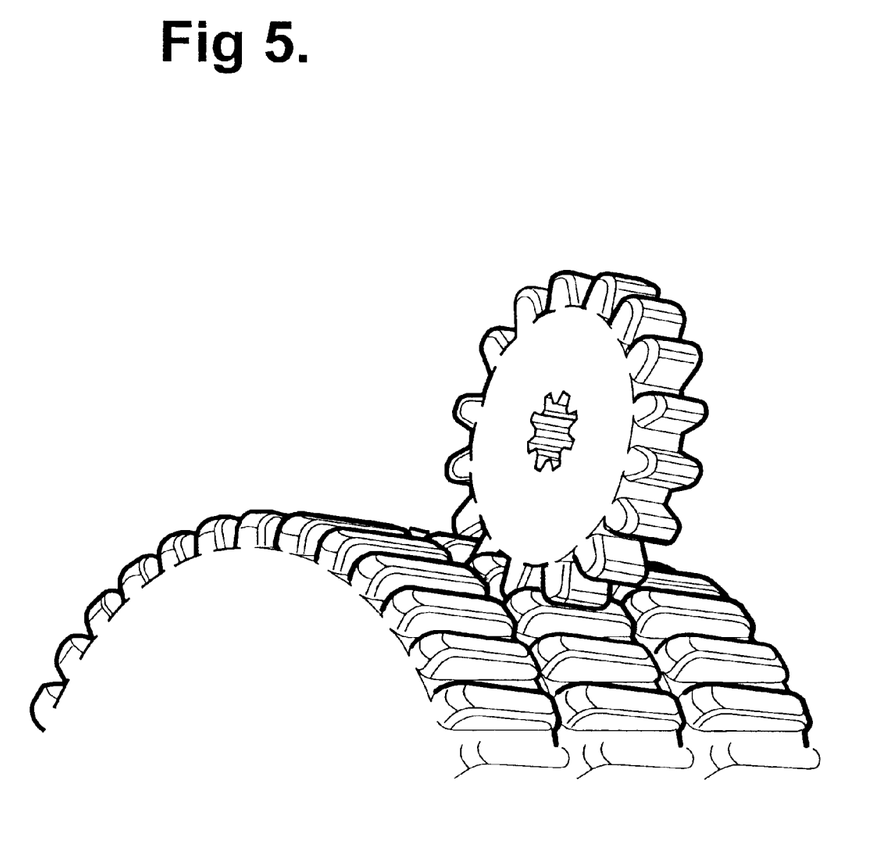
FIG. 5 is an enlarged partial isometric view illustrating the region of intermeshing of gear teeth from FIG. 2.

Turning briefly to the form of gear teeth 18, these are preferably formed in a manner to facilitate meshing from a range of initial positions. This is typically achieved by rounding off the teeth in a number of directions as best seen in FIG. 5. Specifically, each gear tooth is preferably rounded at its axial extremes in such a way as to help guide the teeth of sliding gear wheel 24 between them. This primarily requires rounding using a radius of curvature about an axis projecting radially outwards relative to axis 14, although teeth 18 are typically additionally rounded about the remaining two axes, namely, axes tangential to the gear wheel and parallel to the gear wheel's axis. The teeth of sliding gear wheel 24 itself are preferably also rounded in a similar manner. As a result of this rounding, the conical gear wheels will be displaced to an angular position suitable for meshing from substantially any initial position of contact with sliding gear wheel 24.

Turning again briefly to FIG. 1, it should be noted that smooth transition between ratios is preferably further enhanced by synchronization of actuator 26 with rotation of shaft 12. This is preferably achieved by providing a controller 42 operatively connected to actuator 26 for controlling displacement of sliding gear wheel 24. It will be noted that, for a given pair of adjacent conical gear wheels and their associated spring elements 32, when one gear wheel is in the predefined angular position defined by spring elements 32 and the second is forced to an extreme of the predefined range of angular motion, gear teeth of the pair of conical gear wheels are substantially aligned in at least one changeover region defined angularly about the first axis relative to first transmission shalt 12. Controller 42 may thus be configured to actuate actuator 26 so as to move sliding gear wheel 24 from engagement with the second gear wheel to the first gear wheel when sliding gear wheel 24 is engaged within the second gear wheel in the changeover region. Timing information may be derived from various sources such as, for example, a timing sensor represented schematically an designated 44. The interconnection between sensor 44 and controller 42 has been omitted here for the sake of clarity.

It will be clear that the aforementioned input and output ports of transmission 10 may readily be provided by direct linkage to shafts 12 and 20. In many cases, however, the input and output ports are preferably configured for linking to parallel shafts. To this end, the transmission of FIG. 1 is shown with a supplementary fixed-ratio conical gear wheel linkage, collectively designated 46, which realigns the input or output of shaft 20 by turning shaft 12b which is parallel to, and preferably coaxial with, shaft 12. The entire transmission is preferably contained in a housing 41.

Figure 10:
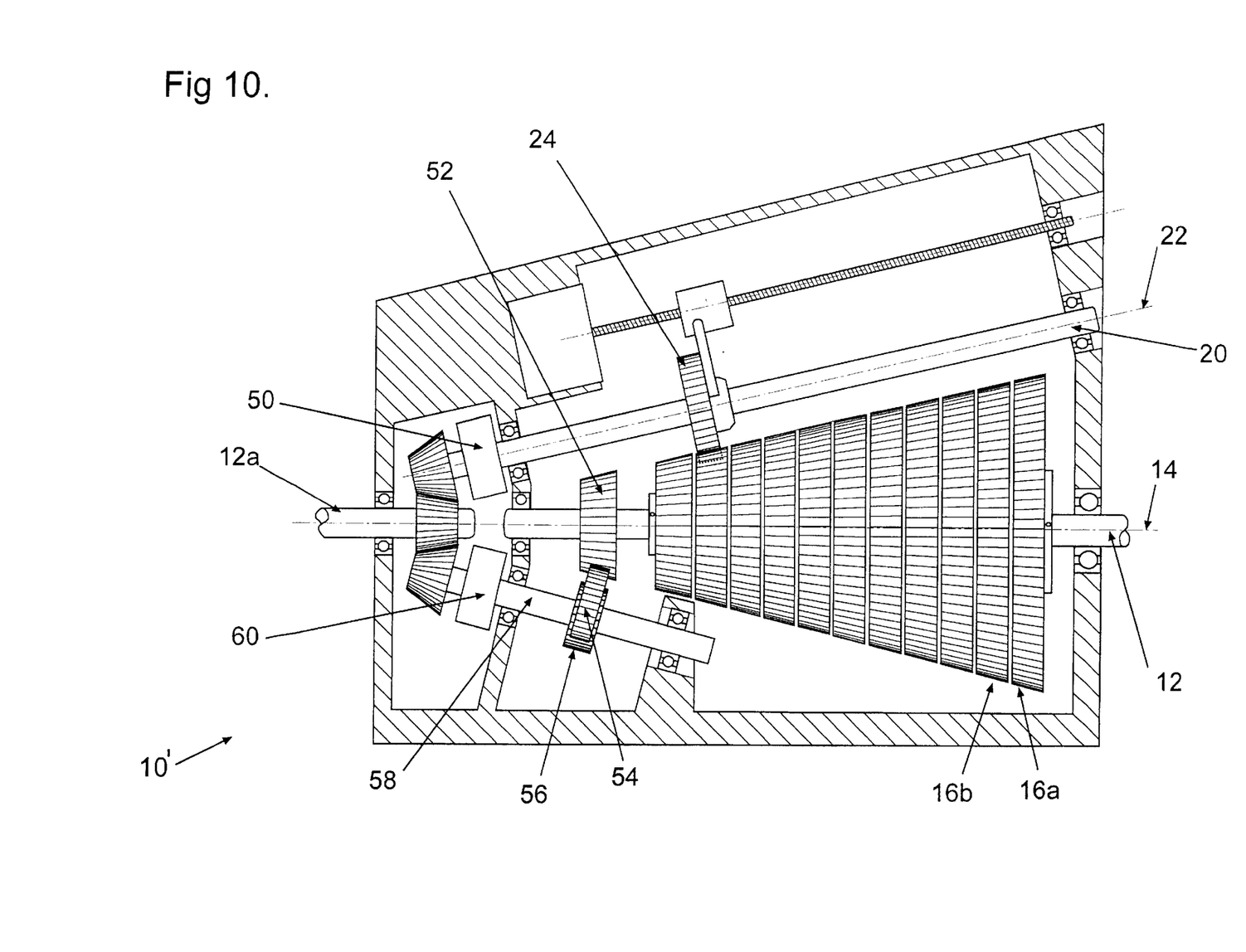
FIG. 10 is a partially cut-away schematic plan view of a variable ratio transmission similar to FIG. 1 illustrating an optional adaptation to provide an additional reversed drive direction mode.
Figure 11:
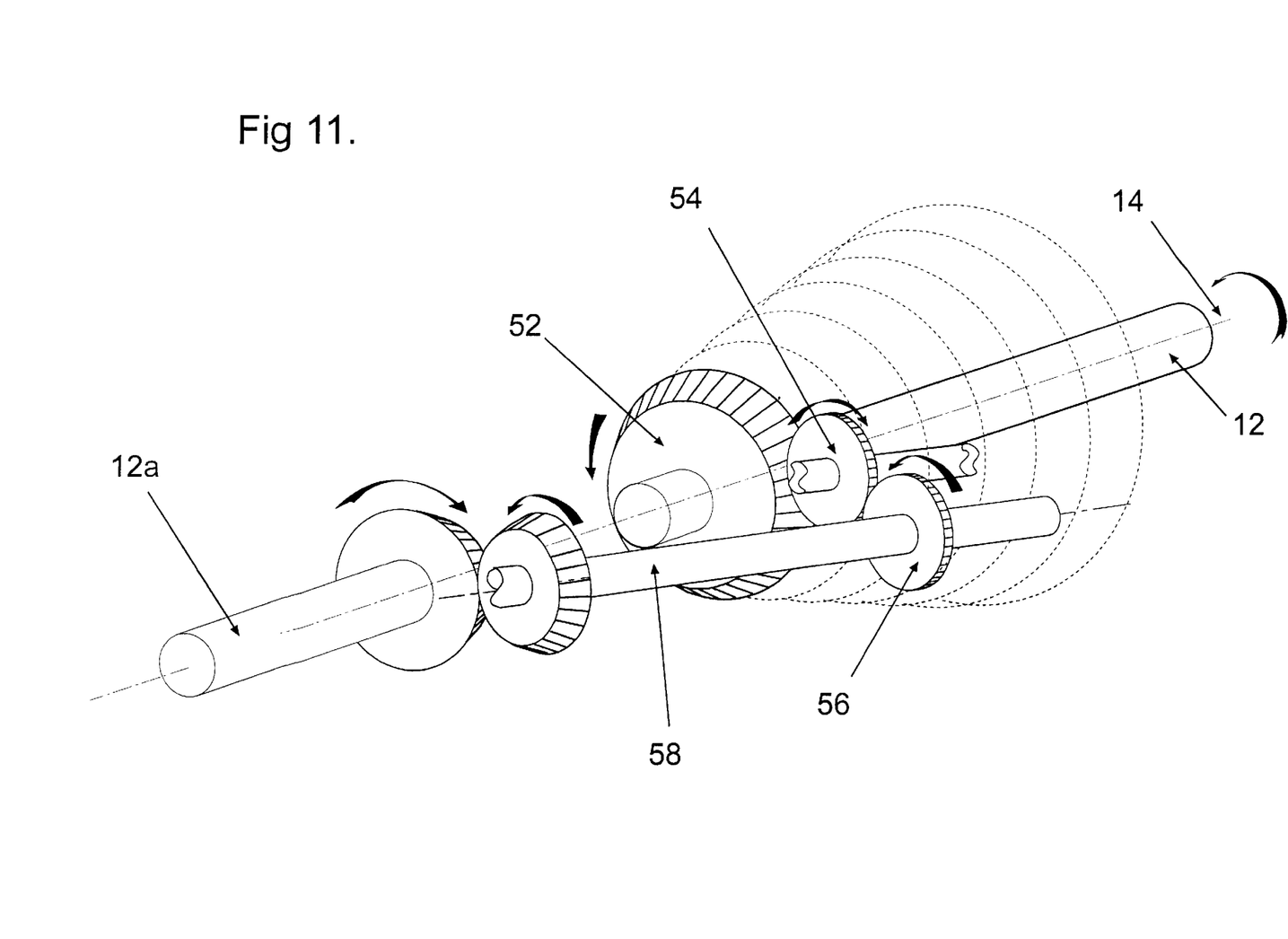
FIG. 11 is a schematic isometric representation of the gear elements operative in the reversed drive direction mode.

Turning finally to FIGS. 10 and 11, there is shown a variable ratio transmission 10', generally similar to transmission 10 described above, but illustrating an optional adaptation to provide an additional reversed drive direction mode. Specifically, shaft 20 is linked to the output port via a first clutch mechanism 50 which is normally engaged. Transmission 10' also features a supplementary conical drive wheel 52, rigidly mounted on shaft 12, which is engaged via a reversing gear 54 with an output drive gear wheel 56 on a supplementary drive shaft 58. Supplementary drive shaft 58 is connected to the output port by a second clutch mechanism 60 which is normally disengaged.

For the forward mode, transmission 10' operates as described above with first clutch mechanism 50 engaged and second clutch mechanism 60 disengaged. When the reversed drive direction mode is required, clutch mechanism 50 is disengaged and clutch mechanism 60 is engaged. FIG. 11 shows schematically the direction reversal function of reversing gear 54, which results in rotation of an output shaft 12a in a sense opposite to the rotation of input shaft 12.

It will be appreciated that the above descriptions are intended only to serve as examples, and that many other embodiments are possible within the spirit and the scope of the present invention.

What is claimed is:

1. A variable ratio transmission for transferring torque between an input port and an output port, the variable ratio transmission comprising:
   (a) a first transmission shaft rotatable about a first axis and configured to provide a first of the input and output ports;
   (b) a series of at least two conical gear wheels of different sizes and having different numbers of gear teeth, each of said conical gear wheels being mounted upon, and rotationally coupled to, said first transmission shaft in such a manner as to define a predefined range of angular motion through which said conical gear can turn relative to said first transmission shaft about said first axis, said series together being a conical external profile at an angle θ to said first axis;
   (c) a second transmission shaft rotatable about a second axis and configured to provide a second of the input and output ports, said second axis being disposed at an angle θ relative to said first axis;
   (d) a sliding gear wheel slidingly engaged with said second transmission shaft so as to rotate together with said second transmission shaft while being slidable in a direction parallel to said second axis, said sliding gear wheel being configured for driving engagement with any one of said conical gear wheels; and
   (e) an actuator associated with said sliding gear wheel and configured to displace said sliding gear wheel along said second transmission shaft parallel to said second axis between positions corresponding to selective engagement with each of said conical gears, thereby varying a drive ratio between said first and second transmission shafts.

2. The variable ratio transmission of claim 1, wherein said series of at least two conical gear wheels is implemented as a series of at least ten conical gear wheels.

3. The variable ratio transmission of claim 1, wherein said predefined range of angular motion through which a given one of said conical gears can turn relative to said first transmission shaft about said first axis is at least equal to an angular spacing of said gear teeth about said axis.

4. The variable ratio transmission of claim 1, further comprising a plurality of spring elements associated at least with said gear wheels and configured to bias said gear wheels to a predefined angular position within said predefined range of angular motion relative to said first transmission shaft.

5. The variable ratio transmission of claim 4, wherein said spring elements are configured to bias said gear wheels to an intermediate angular position within a middle third of said predefined range of angular motion.

6. The variable ratio transmission of claim 4, further comprising a controller operatively connected to said actuator for controlling displacement of said sliding gear wheel, wherein said series of conical gear wheels and said spring elements are configured such that, for a given pair of adjacent ones of said conical gear wheels, when a first of said pair of gear wheels is in said predefined angular position and a second of said pair of gear wheels is forced to an extreme of said predefined range of angular motion, gear teeth of said pair of conical gear wheels are substantially aligned in a changeover region defined angularly about said first axis relative to said first transmission shaft, said controller being configured to actuate said actuator to move said sliding gear wheel from engagement with said second gear wheel to said first gear wheel when said sliding gear wheel is engaged within said second gear wheel in said changeover region.

7. The variable ratio transmission of claim 1, wherein said actuator includes:
   (a) an elongated threaded bolt deployed parallel to said second transmission shaft;
   (b) a rider in threaded engagement with said elongated threaded bolt, said rider being mechanically linked to said sliding gear wheel; and
   (c) a drive unit deployed to rotate said elongated threaded bolt, thereby displacing said rider, and hence said sliding gear wheel, parallel to said second axis.

8. The variable ratio transmission of claim 1, wherein said gear teeth of said conical gear wheels are rounded at their axial extremes.

9. The variable ratio transmission of claim 1, wherein said gear teeth of said conical gear wheels are rounded at their radial extremes.

* * * * *